(12) United States Patent
Yazykov

(10) Patent No.: US 9,523,374 B2
(45) Date of Patent: Dec. 20, 2016

(54) AUTO PUMP BRACKET

(71) Applicant: Andrey Yurievich Yazykov, Moscow (RU)

(72) Inventor: Andrey Yurievich Yazykov, Moscow (RU)

(*) Notice: Subject to any disclaimer, the term of this patent is extended or adjusted under 35 U.S.C. 154(b) by 11 days.

(21) Appl. No.: 14/419,670

(22) PCT Filed: Jul. 26, 2013

(86) PCT No.: PCT/RU2013/000641
§ 371 (c)(1),
(2) Date: Feb. 5, 2015

(87) PCT Pub. No.: WO2014/025289
PCT Pub. Date: Feb. 13, 2014

(65) Prior Publication Data
US 2015/0211549 A1    Jul. 30, 2015

(30) Foreign Application Priority Data
Aug. 10, 2012  (RU) ................. 2012134194

(51) Int. Cl.
*F04D 29/60* (2006.01)
*F17C 13/08* (2006.01)
(Continued)

(52) U.S. Cl.
CPC ............. *F04D 29/605* (2013.01); *A62C 13/78* (2013.01); *F04B 39/14* (2013.01); *F04B 53/22* (2013.01);
(Continued)

(58) Field of Classification Search
CPC ...... F04D 29/605; F04D 29/669; F04D 29/60; F04B 39/14; F04B 53/22; F15B 2201/4056; F15B 2201/40; A62C 13/78; F17C 13/08; F17C 2205/0188; F17C 2205/0192
(Continued)

(56) References Cited

U.S. PATENT DOCUMENTS 177,471 A * 5/1876 Clark ..................... A22B 5/06
                                            211/87.01
327,939 A * 10/1885 Garrison ............... A47B 57/42
                                            248/222.13
(Continued)

FOREIGN PATENT DOCUMENTS

RU     2031255 C1    3/1995
RU      98974 U1   11/2010
(Continued)

*Primary Examiner* — Eret McNichols
(74) *Attorney, Agent, or Firm* — Nadya Reingand

(57) ABSTRACT

The bracket comprising a rail (1) with the base and the holes (2) for fastening to the vertical support. Two pairs of guides (4) in pairs making up the slots narrowing towards the bottom to allocate the top ends of the posts (5), connected with the arched console (9) by means of the stiffeners (6,7) and the strut (8) with at least one tangential flange (10) with a hole (11) to fasten the installed equipment. It is achieved simplifying of operations and reducing time for installation on a wall and a column, simplifying mounting of pump equipment on the arched console surfaces, increasing repairability, durability, providing a possibility of dismantle, compact storing and transporting and re-installation.

12 Claims, 5 Drawing Sheets

Figure 1:
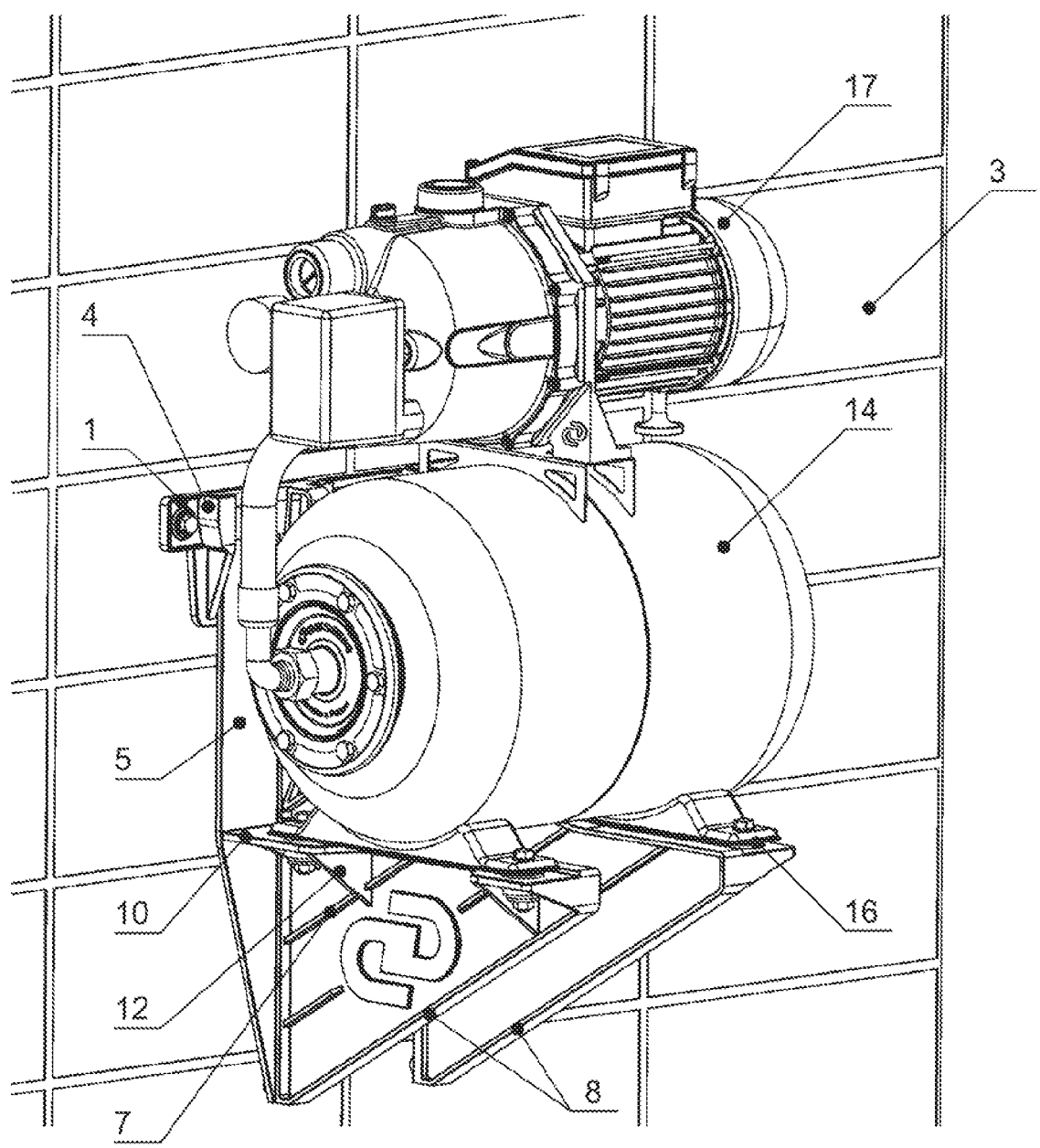

(51) Int. Cl.
  *F04D 29/66*  (2006.01)
  *A62C 13/78*  (2006.01)
  *F04B 39/14*  (2006.01)
  *F04B 53/22*  (2006.01)
  *F16M 13/02*  (2006.01)

(52) U.S. Cl.
  CPC ............. *F04D 29/60* (2013.01); *F04D 29/669* (2013.01); *F16M 13/02* (2013.01); *F17C 13/08* (2013.01); *F15B 2201/40* (2013.01); *F15B 2201/4056* (2013.01); *F17C 2205/0188* (2013.01); *F17C 2205/0192* (2013.01)

(58) Field of Classification Search
  USPC ....... 248/65, 72, 75, 221.11, 222.13, 223.41, 248/224.51, 224.61, 224.7, 225.11
  See application file for complete search history.

(56) References Cited

U.S. PATENT DOCUMENTS

| | | | | |
|---|---|---|---|---|
| 412,499 A | * | 10/1889 | Hamilton | F16M 11/04 220/482 |
| 459,844 A | * | 9/1891 | Thomas | E06C 9/04 144/287 |
| 614,177 A | * | 11/1898 | McBride | E06C 9/04 182/92 |
| 998,112 A | * | 7/1911 | Murray | H01B 17/16 174/149 R |
| 1,260,695 A | * | 3/1918 | Masson | F16L 3/13 182/92 |
| 1,657,939 A | * | 1/1928 | Rockwell | F16L 3/221 248/243 |
| 1,775,391 A | * | 9/1930 | Fassinger | F16L 3/221 248/243 |
| 1,802,964 A | * | 4/1931 | Brady | F16L 3/221 248/68.1 |
| 1,830,438 A | * | 11/1931 | Miller | F16L 3/221 174/158 R |
| 1,861,100 A | * | 5/1932 | Stanitz | E03C 1/322 248/225.21 |
| 1,935,179 A | * | 11/1933 | Orear | F04D 29/646 417/363 |
| 2,103,106 A | * | 12/1937 | Yurkovitch | A47B 57/42 211/189 |
| 2,285,632 A | * | 6/1942 | Urbain | A47F 7/0035 211/60.1 |
| 2,708,088 A | * | 5/1955 | Steinke | H05K 7/1421 248/221.12 |
| 2,872,144 A | * | 2/1959 | Hobson | A47B 57/30 248/218.4 |
| 2,925,920 A | * | 2/1960 | Skubic | A47B 57/402 108/107 |
| 2,952,343 A | * | 9/1960 | Modrey | F16B 2/241 248/221.11 |
| 2,997,269 A | * | 8/1961 | Urbain | A47B 57/34 108/106 |
| 3,003,734 A | * | 10/1961 | Davis | A24F 19/0092 248/223.31 |
| 3,164,255 A | * | 1/1965 | Jay | A47B 57/52 211/193 |
| 3,233,856 A | * | 2/1966 | Ammerman | H05K 7/12 248/229.26 |
| 3,414,224 A | * | 12/1968 | Watford | A47B 57/402 211/192 |
| 3,540,687 A | * | 11/1970 | Cuva | F21V 19/0005 248/223.41 |
| 3,637,084 A | * | 1/1972 | Uitz | A47F 5/0853 16/94 D |
| 3,881,677 A | * | 5/1975 | Ihlenfeld | A47C 7/62 248/224.51 |
| 4,013,253 A | * | 3/1977 | Perrault | A47B 96/061 248/222.51 |
| 4,039,131 A | * | 8/1977 | Perrault | F16L 3/1218 248/220.43 |
| 4,181,279 A | * | 1/1980 | Perrault | F16L 3/00 248/222.51 |
| 4,274,614 A | * | 6/1981 | Worrallo | A47B 57/56 248/243 |
| 4,372,450 A | * | 2/1983 | Licari | A47G 25/0678 211/106.01 |
| 4,444,323 A | * | 4/1984 | Travis | A47B 57/52 108/108 |
| 4,620,736 A | * | 11/1986 | Shanks | B60D 1/06 224/517 |
| 4,722,113 A | * | 2/1988 | Olsson | A47L 13/58 15/143.1 |
| 4,858,869 A | * | 8/1989 | Stang | A47G 23/0225 248/311.2 |
| 5,060,898 A | * | 10/1991 | Chang | A47K 5/02 248/224.51 |
| 5,078,279 A | * | 1/1992 | Hancock | A47B 81/005 211/64 |
| 5,080,238 A | * | 1/1992 | Hochman | A47F 5/0869 211/106.01 |
| 5,092,546 A | * | 3/1992 | Wolfbauer | F16L 3/22 211/193 |
| 5,226,625 A | * | 7/1993 | Hanna | A47K 5/12 248/222.13 |
| 5,356,105 A | * | 10/1994 | Andrews | B63B 35/14 248/221.11 |
| 5,433,416 A | * | 7/1995 | Johnson | B65D 23/003 248/475.1 |
| 5,494,250 A | * | 2/1996 | Chen | A47K 10/185 248/316.7 |
| 5,553,823 A | * | 9/1996 | Protz, Jr. | A01G 5/04 248/215 |
| 5,564,346 A | * | 10/1996 | Robben | A47B 9/00 108/108 |
| 5,695,078 A | * | 12/1997 | Otema | A47B 57/045 108/108 |
| 5,695,163 A | * | 12/1997 | Tayar | A47B 96/061 248/225.21 |
| 5,707,033 A | * | 1/1998 | Holt | H01Q 1/125 248/223.41 |
| 5,709,057 A | * | 1/1998 | Johnson, Jr. | G09F 7/18 248/219.2 |
| 5,957,416 A | * | 9/1999 | Sellati | F16L 3/133 248/58 |
| 6,098,941 A | * | 8/2000 | Gates | A47B 96/061 248/224.51 |
| 6,220,843 B1 | | 4/2001 | Allen | |
| 6,234,445 B1 | * | 5/2001 | Yoon | B60R 11/00 248/638 |
| 6,257,543 B1 | * | 7/2001 | Huelsmann | B06B 1/00 248/638 |
| 6,481,679 B1 | * | 11/2002 | Bennett | A61G 13/101 248/223.41 |
| 6,491,504 B2 | * | 12/2002 | Nakagaki | F16F 15/08 248/638 |
| 6,557,807 B1 | * | 5/2003 | Belanger | H02G 3/26 248/215 |
| 6,637,707 B1 | * | 10/2003 | Gates | A47B 81/005 211/64 |
| 6,688,568 B1 | * | 2/2004 | Moufflet | A47B 96/067 211/103 |
| 7,140,500 B2 | * | 11/2006 | McCoy | H02G 3/30 211/60.1 |
| 7,172,164 B2 | * | 2/2007 | Fuelling | A01K 97/10 248/309.1 |
| 7,191,998 B1 | * | 3/2007 | Chalberg | F16M 7/00 248/225.21 |
| 7,201,282 B1 | * | 4/2007 | Alderman | A47B 81/00 211/100 |
| 7,210,657 B2 | * | 5/2007 | Plate | B64C 1/00 248/228.1 |
| 7,225,936 B2 | * | 6/2007 | Jersey | A47B 45/00 211/189 |

(56) References Cited

U.S. PATENT DOCUMENTS

| | | | | |
|---|---|---|---|---|
| 7,407,138 B1* | 8/2008 | Gretz | | F16L 3/02 |
| | | | | 248/304 |
| 7,490,801 B2* | 2/2009 | Plate | | F16B 2/02 |
| | | | | 248/228.1 |
| 7,703,735 B2* | 4/2010 | Fryer | | A47F 5/0006 |
| | | | | 24/372 |
| 7,931,162 B2* | 4/2011 | Swanson | | B67D 1/0892 |
| | | | | 211/194 |
| 8,016,137 B2* | 9/2011 | Shaha | | A47B 96/061 |
| | | | | 211/103 |
| 8,104,726 B2* | 1/2012 | Hoernig | | A47K 17/022 |
| | | | | 248/220.22 |
| 8,172,190 B2* | 5/2012 | Dang | | F04B 39/12 |
| | | | | 248/220.22 |
| 8,282,823 B2* | 10/2012 | Acernese | | B01D 61/025 |
| | | | | 210/236 |
| 8,376,484 B2* | 2/2013 | Benz | | A47B 57/562 |
| | | | | 108/108 |
| 8,500,078 B2* | 8/2013 | Castellanos | | A47B 96/06 |
| | | | | 211/87.01 |
| 8,678,206 B2* | 3/2014 | Kubiniec | | A47B 81/005 |
| | | | | 211/64 |
| 8,714,501 B2* | 5/2014 | Dang | | F04B 39/12 |
| | | | | 248/220.22 |
| 8,840,071 B2* | 9/2014 | Oh | | F16L 3/1075 |
| | | | | 248/58 |
| 8,960,612 B2* | 2/2015 | McCoy | | F16L 3/223 |
| | | | | 211/193 |
| 9,044,090 B2* | 6/2015 | Drake | | A47B 57/34 |
| 2002/0125389 A1* | 9/2002 | Chu | | A47B 96/027 |
| | | | | 248/235 |
| 2002/0190171 A1* | 12/2002 | Stock | | B60R 11/0211 |
| | | | | 248/224.7 |
| 2003/0221794 A1* | 12/2003 | Morris | | A47H 2/00 |
| | | | | 160/38 |
| 2004/0232293 A1* | 11/2004 | Lindbeck | | B65D 88/66 |
| | | | | 248/225.11 |
| 2005/0274299 A1* | 12/2005 | Bienick | | A47B 57/48 |
| | | | | 108/108 |
| 2008/0298042 A1* | 12/2008 | Fox, IV | | H04Q 1/06 |
| | | | | 361/825 |
| 2011/0132853 A1* | 6/2011 | Drobot | | A47B 57/562 |
| | | | | 211/42 |
| 2013/0228349 A1* | 9/2013 | Yang | | A62C 13/78 |
| | | | | 169/51 |
| 2014/0103130 A1* | 4/2014 | Brown | | F16M 13/02 |
| | | | | 237/66 |
| 2015/0335179 A1* | 11/2015 | Lashinske | | F16M 13/02 |
| | | | | 248/314 |
| 2016/0067534 A1* | 3/2016 | Rousseau | | A62C 13/78 |
| | | | | 169/51 |

FOREIGN PATENT DOCUMENTS

| | | |
|---|---|---|
| RU | 2465020 C2 | 10/2012 |
| UA | 9261 A1 | 9/1996 |

\* cited by examiner

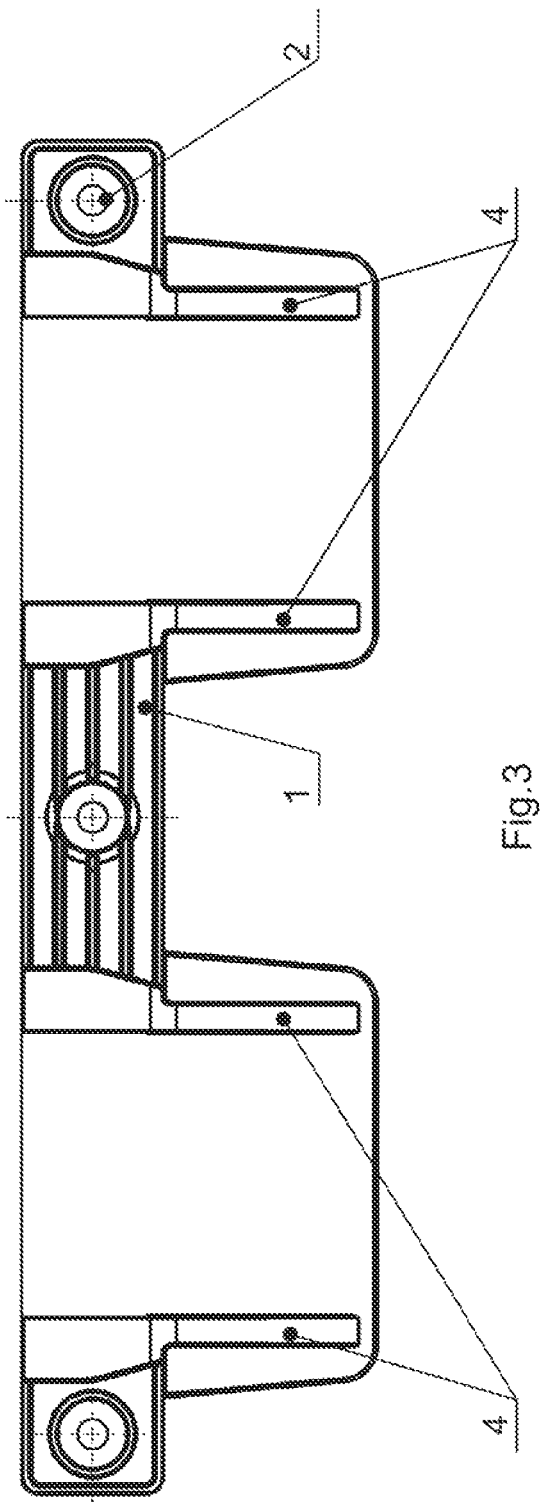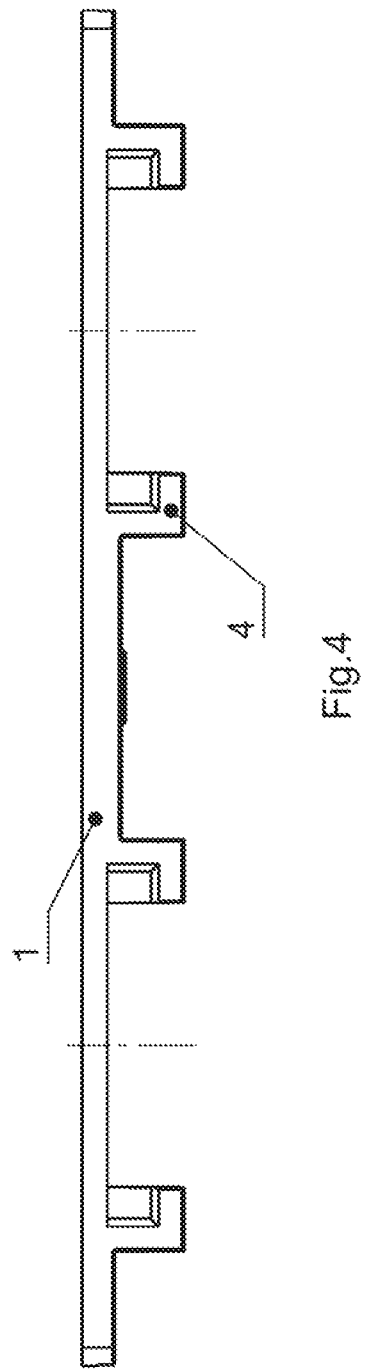
Fig.3
Fig.4

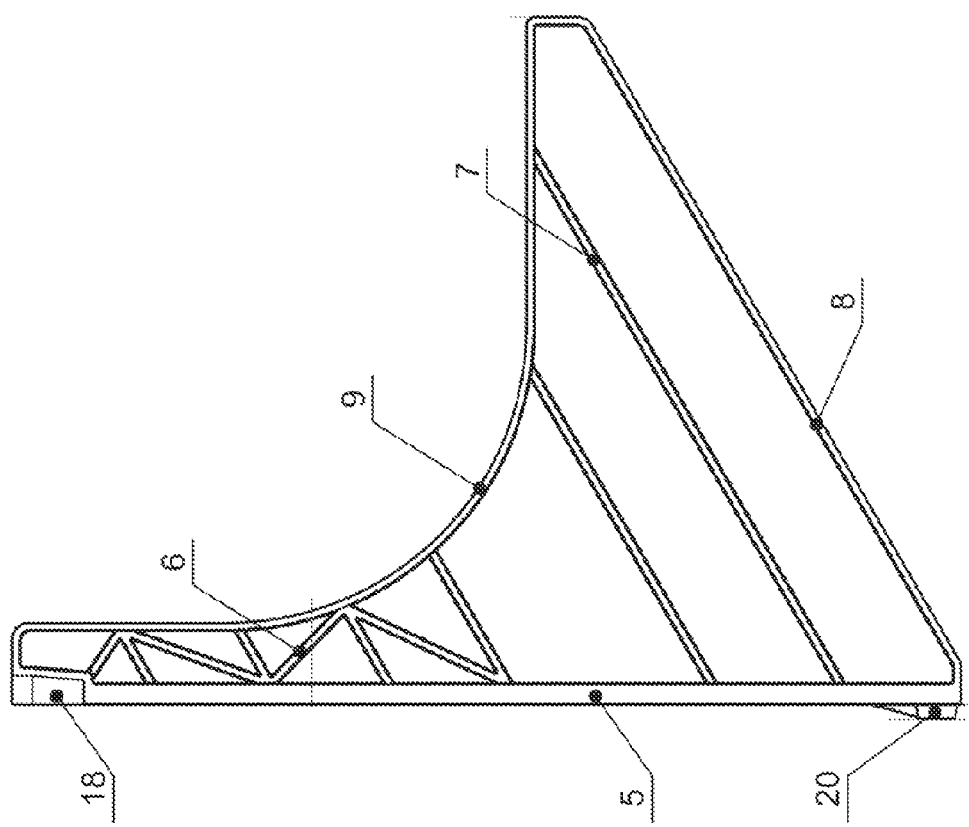
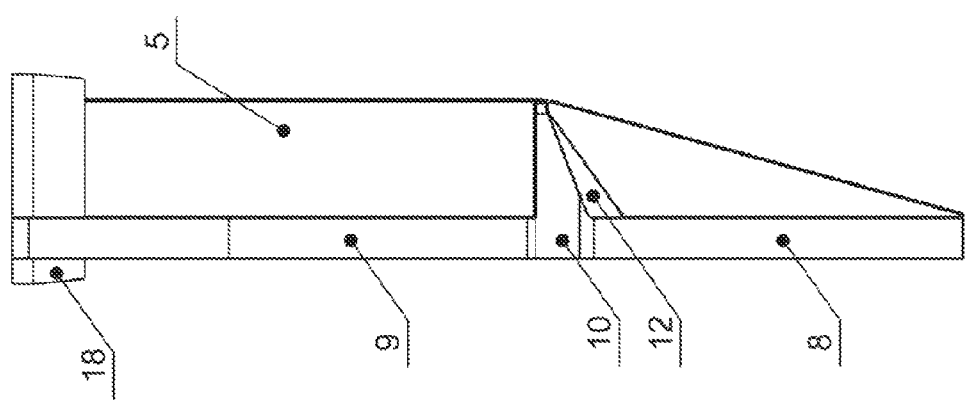

AUTO PUMP BRACKET

CROSS-REFERENCE TO RELATED APPLICATIONS

The present application is a National Stage application of the PCT application PCT/RU2013/000641 filed on Jul. 26, 2013 claiming, priority to Russian application RU2012134194 filed on Aug. 10, 2012 now issued as a patent RU 123473.

FIELD OF THE INVENTION

The invention refers to the field of hydraulics and is basically a bracket, it is a supporting structure designed to fix the auto pump, provided with the horizontal cylindrical hydroaccumulator, on the vertical face (a wall or a column).

PRIOR ART

There is a composite lift-up bracket for the mounting assembly, including the L-shaped profile with the lateral comb-type bearing surface with an anchor and a gasket, provided with the carrier guide profile having lateral comb-type bearing surface, which lower part contains the box console with a free aperture and longitudinal shoulders on the internal side walls, and the comb-type bearing surfaces of the L-shaped and box console profiles are provided with the coaxial longitudinal slots for installation of split-type members fixing them relative to one another, and the internal side walls of the box console and the longitudinal shoulders interact with the H-shaped vertical girth rail having longitudinal slots outside on top, and the bottom of the vertical girth rail is provided with longitudinal shoulders inside (RU No 44705).

There is a bracket, having the upper and the lower bearing members, with the upper member made up of a vertical and a horizontal part, and the above mentioned vertical part is provided with a hole for the fastener, and the horizontal part of the upper member represents a frame, the lower bearing member is made up minimum of two upright posts, each of them is rigidly connected to the said frame on the top end, and is provided with the fastener on the bottom end that can interact with the hollow in the bearing surface. Horizontal part of the upper member represents a rectangular frame with stiffeners at the angles and is connected to the lower bearing member by means of rigid braces (RU No 36951).

There is a bracket for fastening of the transport vehicle hydraulic power steering pump, containing the support with the mounting holes, the support represents a plate with the upper and the lower surfaces shaped as truncated rectangular trapezium with the front face, the rear face and the side faces, the truncate side face, the support also contains additional shoulders running parallel to each other, with the mounting holes (RU No 98974).

There is also a bracket for console or other element suspension on the upright bearing post, provided with the console to bracket and bracket to post connectors, and the bracket is made up of the front part, to which the console or other device element, e.g. a rack, is fastened, and the rear part on the rear of the bearing post passing inside the bracket, the front and the rear parts of the bracket are connected using strut side members on the both sides of the bearing post, and the rear part of the bracket is above the front, and there are fasteners provided on the front, rear or both parts of the bracket to fasten the bracket to the post from top to bottom, the fastener(s) are turned inside towards the bearing post, provided with the holes along the post in line with the fasteners so that the fastener(s) could match the holes, the front and the rear parts of the bracket are supported by the post, and the load is transferred from the console to the post (RU No 54296, prototype)

The drawback of available brackets is problematic mounting on the wall or on the column, difficulty of pump equipment installation, low maintainability, short service life in case the pump operation entails vibration, no possibility of non-destructive dismantling, parts replacement and reassembly for repeated use.

SUMMARY OF THE INVENTIONS

The engineering task of the invention is creation of an efficient auto pump bracket and expansion of a store of brackets.

The engineering result ensuring solution of the assigned task lies in simplification of mounting on the wall or on the colunm, simplification of pump equipment installation, improvement of maintainability, service life in case of pump operation on the console, support of a possibility of dismantling and reassembly for repeated use of the bracket.

The essence of the invention is that the bracket has a rail with the base and the holes to be fastened to the vertical support, and two pairs of guides, in pairs making up the slots narrowing towards the bottom to allocate the top ends of the posts, each connected to the arched console by means of stiffeners and struts, tangent to which there is at least one flange with a hole to fasten the installed equipment.

It is preferred if the pairs of slots narrowing towards the bottom are made trapezoid, the top ends of the posts match the shape of the narrowing rail slots, the posts are wider than the arched consoles, each at one end of the post, the stiffeners are sloping, each arched console is made as a strip with a constant width, the flanges are provided with the triangular supports and two holes, the flange of one of the consoles is located on the right, and of the other—on the left, the post in the post to strut junction point is provided with a stop on the vertical support side, the arched consoles have cylindrical sections matching the shape of installed equipment, hydroaccumulator in particular, flange holes provide for a possibility of hydroaccumulator supports fastening.

SHORT DESCRIPTION OF DRAWINGS

Figure 2:
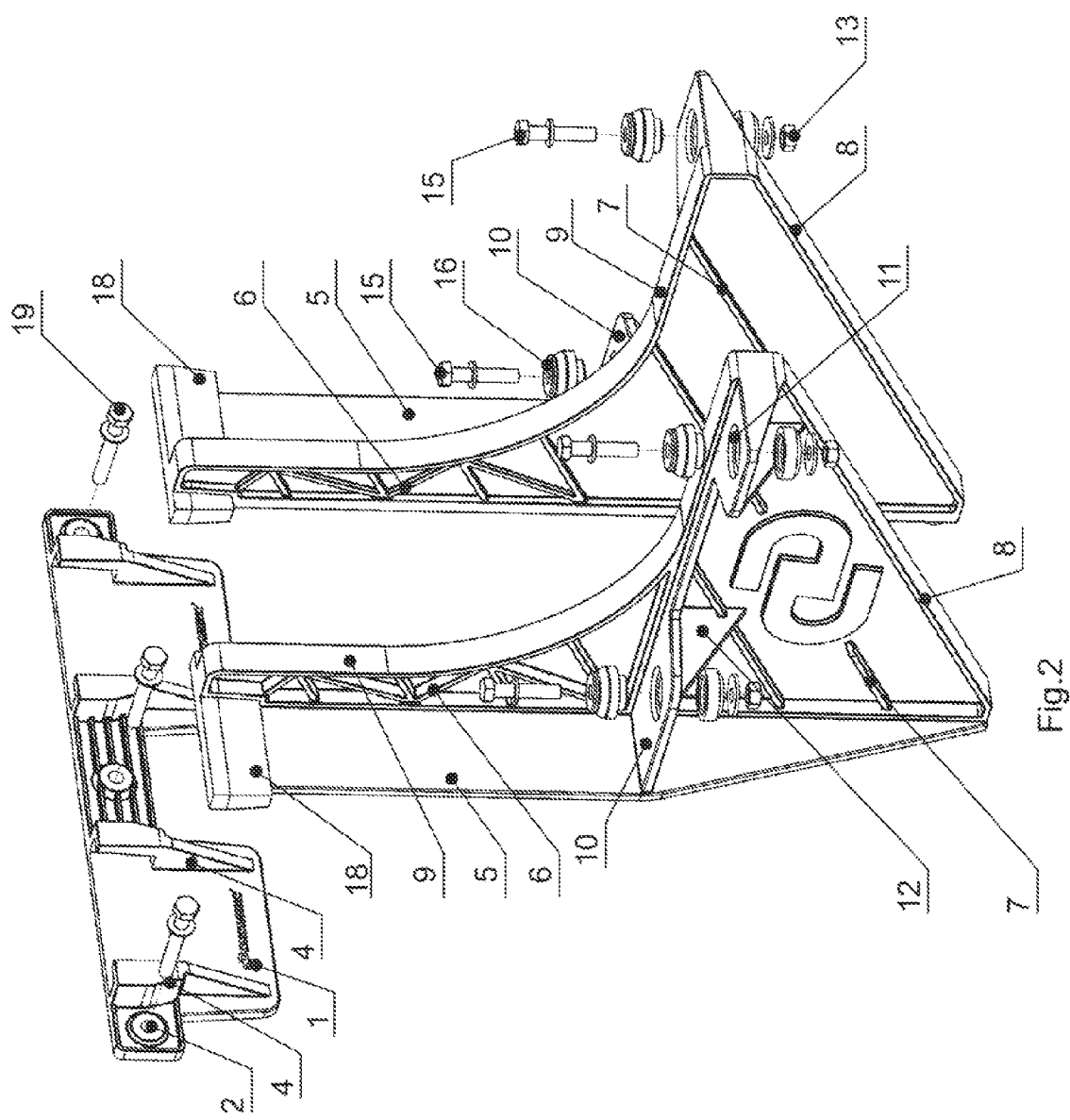
Figure 6:
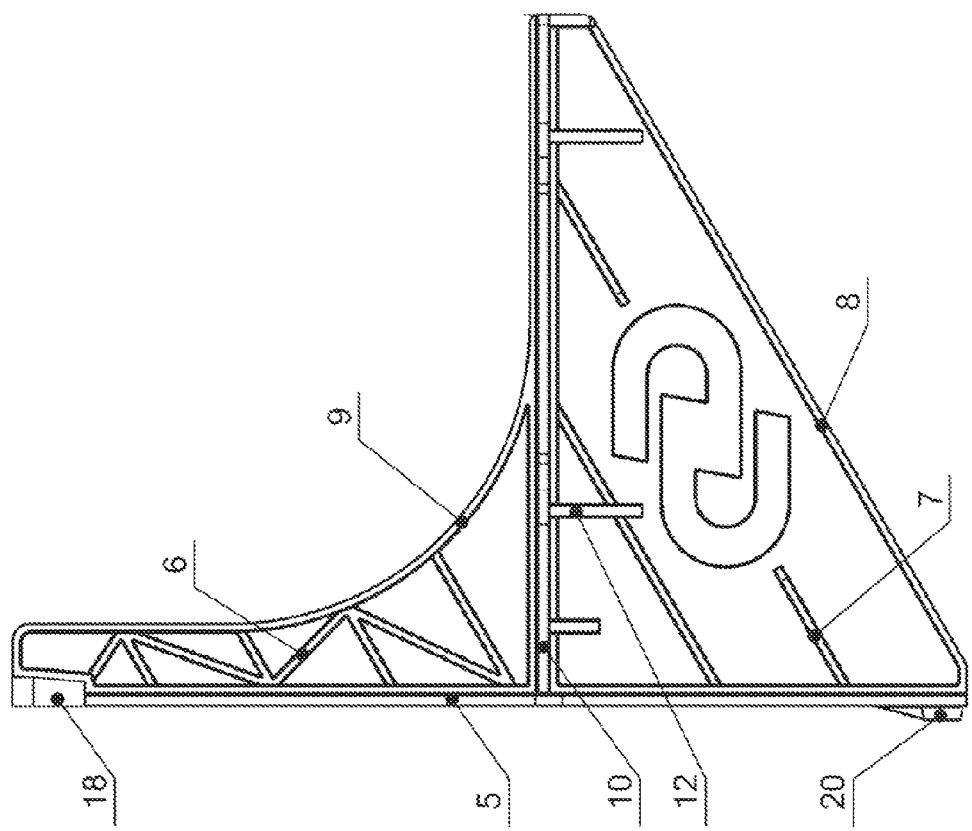
Figure 5:
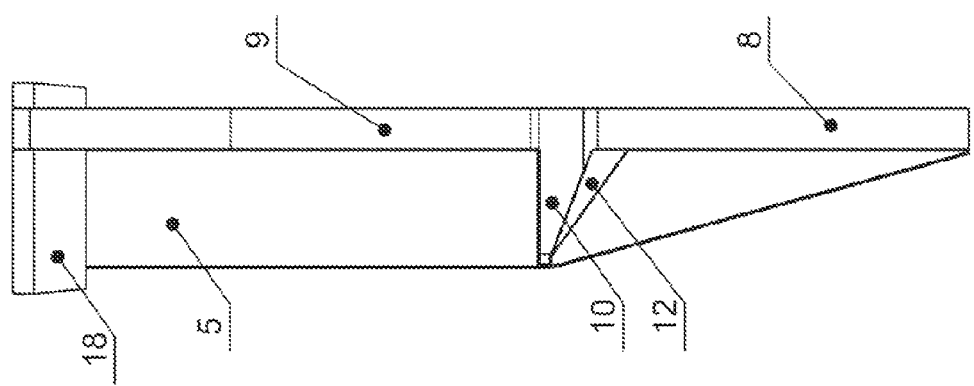

FIG. 1 shows the structural layout of bracket and auto pump installation,
FIG. 2—the bracket exploded,
FIG. 3—the rail,
FIG. 4—the top view of the FIG. 3,
FIG. 5—the left console,
FIG. 6—the right-side view of the FIG. 5,
FIG. 7—the right console,
FIG. 8—the right-side view of the FIG. 7.

The bracket includes the rail 1 with the base (flat bearing surface) and holes 2 for fastening to the vertical support, e.g. to the wall 3, and two pairs of guides 4, in pairs making up the slots narrowing towards the bottom to allocate the top ends of the posts 5, each connected by means of the stiffeners 6,7 and the strut 8 to the arched console 9, tangent to which there is at least one flange 10 with the hole 11 to fasten the installed equipment.

The pairs of slots, made up by the guides 4, narrowing towards the bottom are trapezoid (of trapezoid profile, with the trapezoid-shaped cross-section).

The top ends 18 of the posts 5 match the shape of the narrowing slots (of trapezoid profile, with the trapezoid-shaped cross-section), made up by the guides 4 of the rail 1, i.e. with the trapezoid shape of the above mentioned slots the top ends 18 of the posts 5 have a trapezoid shape.

The posts 5 are wider than the ached consoles 9, each located at one of the vertical ends of the post 5.

The stiffeners 6,7 are sloping to the posts 5 and together with the struts 8 and with the consoles 9.

Each of the ached consoles 9 represents a strip of a constant width.

The ends of the flanges 10 are connected to the posts 5 and are provided with the triangular supports (slopes) 12, and two holes 11.

The flange 10 of one of the consoles 9 is on the right, and of the other—on the left. Each post 5 is joined with the strut 8, the console 9, the stiffeners 6,7, and the flange 10.

The post 5 in the post to strut 8 junction point is provided with the stop 20 on the side of the vertical support 3.

Each of the ached consoles 9 has a cylindrical section tangentially turning flat on top and at the bottom (not shown).

The ached consoles 9 have cylindrical sections matching the shape of the installed equipment, particularly the cylindrical body of the horizontal hydroaccumulator 14.

The holes 11 of the flanges 10 provide for a possibility of fastening with the screws 15 and the nuts 13 through the elastic dampers 16 of the hydroaccumulator 14 supports, connected to the auto pump 17 with the electric motor, installed above. To fasten the rail 1 to the wall 3 there are the accessories 19.

All parts of the bracket, shown in FIGS. 3-8, are stamped or cast of plastic under pressure (durable plastic).

DETAILED DESCRIPTION OF THE INVENTION

Preferred Embodiment

The auto pump bracket is operated as follows.

The rail 1 is fixed (fastened) to the wall 3 through the holes 2 using the accessories 19. The ends 18 of the posts 5 are firmly inserted into the narrowing slots, made up by the guides 4 of the rail 1. And the stops 20 of the posts 5 rest against the wall 3, and the consoles 9 protrude forward and together with the flanges 10 and the struts 8 engage in a working position.

The auto pump 17 together (assembled) with the hydroaccumulator 14 is fastened through the holes 11 to the flanges 10 with the screws 15 through the elastic dampers (gaskets) 16. After the main lines of the pump 17 are connected to fluid source and to the consumer, it is ready for operation.

During operation of the pump 17 the bracket woks according to the mechanical principle of operation—material resistance to fracture and shear. The strut 8 squeezes and supports the structural members of the console 9, due to its arched shape and availability of the strut 8, stability of the turned on pump is assured. The stiffeners 6,7 ensure the required rigidity of the construction, and the elastic dampers 16 prevent the pump vibration transfer to the rail 1.

The hydroaccumulator (horizontal) 14 is designed to protect the pump against frequent activation that promotes extension of the pump 17 life.

In case it is necessary to change the place of operation of the pump 17, the screws 15 are removed and the hydroaccumulator 14 and the pump 17 are dismantled. The posts 5 are taken out of the slots of the rail 1, and the latter is removed from the wall 3, for which purpose the accessories 19 are removed. All bracket parts are completely serviceable and replaceable after dismantling, if necessary, they can be easily replaced and compactly packed for transportation. At a new place of operation the similar procedure of bracket installation is carried out.

Realization of the set of attributes of the invention integrated within the single creative concept results in obtaining of simplified operations and reduction of the time of mounting on the wall or the column due to reduction of the number of operations and their simplification, simplified installation of the pump equipment on the arched surfaces of the consoles, equally spaced along the equipment installed on the console, improved maintainability due to a possibility of any bracket part replacement, extended service life in case the pump operation entails vibration due to availability of the stiffeners along with the strut and the flanges, ensured possibility of dismantling, compact storage and transportation, and reassembly of the posts with the strut and the console on the rail for repeat and further usage.

INDUSTRIAL APPLICATIONS

The present invention is embodied with multipurpose equipment extensively employed by the industry.

The invention claimed is:

1. A bracket, comprising: a rail with a base having holes for fastening the rail to a vertical wall, and the rail having two pairs of guides protruding perpendicular to the base, a first, a second, a third and a fourth guides being parallel to each other and positioned at the same horizontal level, a distance between the second and the third guide corresponds to a length of an installing equipment; each guide having a trapezoid slot narrowing towards a bottom, the slots allocate top ends of posts, the posts being parallel to the base of the rail; the top ends of the posts match trapezoid shape of the slots; the posts are connected with arched consoles by means of stiffeners and struts, a shape of the arched console exactly matching a shape of the installing equipment; with at least one tangential flange with a hole on each post to fasten the installing equipment; and a distance between the flanges corresponds to a distance between fastening elements of the installing equipment.

2. The bracket according to claim 1, wherein each post has at least 6 stiffeners.

3. The bracket according to claim 2, wherein the posts have stiffeners at a slope angle of about 45 degrees to a plane of the post.

4. The bracket according to claim 3, wherein the posts, are wider than the arched consoles at one end of the post.

5. The bracket according to claim 2 wherein the stiffeners are sloping stiffeners.

6. The bracket according to claim 1, wherein the arched consoles, each is a strip of a constant width.

7. The bracket according to claim 1, wherein the flanges are provided with triangular supports and two holes.

8. The bracket according to claim 1, wherein one flange of one console is on a right side of the console, and another flange is on a left side of the console.

9. The bracket according to claim 1, wherein a stop is provided in the post to a strut junction point on a vertical support side.

10. The bracket according to claim 1, wherein the arched consoles have cylindrical sections, turning flat on a top and at a bottom.

11. The bracket according to claim 1, wherein the arched consoles have cylindrical sections, matching a shape of the installing equipment, particularly hydroaccumulator.

12. The bracket according to claim 11, further comprising holes on the flanges, providing for a possibility of hydroaccumulator supports fastening.

\* \* \* \* \*